United States Patent [19]

Huber et al.

[11] 3,794,973

[45] Feb. 26, 1974

[54] METHOD OF ERROR DETECTION IN PROGRAM CONTROLLED TELECOMMUNICATION EXCHANGE SYSTEMS

[75] Inventors: Josef Huber; Ulrich Lenz, both of Munich, Germany

[73] Assignee: Siemens Aktiengesellschaft, Berlin and Munich, Germany

[22] Filed: July 12, 1971

[21] Appl. No.: 161,617

[30] Foreign Application Priority Data

July 10, 1970 Germany .................. P 20 34 423.4

[52] U.S. Cl. ................340/146.1 BE; 179/175.2 C; 235/153 AC; 235/153 AK

[51] Int. Cl. ........................ G05b 23/02, G06f 11/04

[58] Field of Search ............ 235/153; 340/146.1 BE; 179/18 ES, 175.2 C, 175.2 R; 444/1

[56] References Cited

UNITED STATES PATENTS

| | | | |
|---|---|---|---|
| 3,060,273 | 10/1962 | Nowak et al. | 179/175.2 R |
| 3,256,513 | 6/1966 | Merz | 340/146.1 BE |
| 3,401,380 | 9/1968 | Bell et al. | 178/2 R |
| 3,403,383 | 9/1968 | Kienzle | 179/18 ES X |
| 3,517,171 | 6/1970 | Avizienis | 235/153 |
| 3,519,808 | 7/1970 | Lawder | 235/153 |
| 3,544,777 | 12/1970 | Winkler | 235/153 |
| 3,553,384 | 1/1971 | Lucas | 179/18 ES |
| 3,599,179 | 8/1971 | Arnold | 235/153 X |
| 3,647,979 | 3/1972 | Rubin | 179/18 ES |
| 3,652,804 | 3/1972 | Comella | 179/18 ES |

OTHER PUBLICATIONS

McCracken, D. D., et al. Numerical Methods and Fortran Programming. N.Y., John Wiley and Sons, Inc., 1964. p. 2–3 and 112–113.

*Primary Examiner*—Malcolm A. Morrison
*Assistant Examiner*—R. Stephen Dildine, Jr.
*Attorney, Agent, or Firm*—Schuyler, Birch, Swindler, McKie & Beckett

[57] ABSTRACT

A method is described for accomplishing the diagnosis of errors in modular constructed, program controlled data exchange systems. The method contemplates the use of a specific program for error diagnosis. Redundance of the system is increased when several operating units in the system operate together in a cyclic fashion with central memories. When a particular unit of the system is recognized as malfunctioning, it is placed in a diagnosis state, and during the continuance of this state, the malfunctioning unit is active only for special test processes run under the control of the diagnostic program utilizing properly functioning units in the system. In carrying out the dianostic program, the properly functioning units are placed in the diagnostic state either constantly or at least for the duration of an operating cycle, as needed. A central sequence demand control, which receives, assigns and selects sequence requirements sent by the units of the system, is placed in a diagnostic state for running the diagnostic program in conjunction with the malfunctioning system unit now placed in the diagnosis state, along with a properly functioning program control unit for controlling the sequence and a properly functioning storage element. The sequence demand control operates in such a manner during the diagnosis state such that only particular cycle-related sequence demands of those units which are at the time in the diagnosis state are considered.

3 Claims, 2 Drawing Figures

METHOD OF ERROR DETECTION IN PROGRAM CONTROLLED TELECOMMUNICATION EXCHANGE SYSTEMS

BACKGROUND OF THE INVENTION

The invention described herein is concerned with program controlled telecommunication exchange installations, and particularly such installations which are constructed in modular form. Further, the invention is particularly concerned with the diagnosis of errors in such systems utilizing the specific diagnostic program for operating the system in such a manner that the sources of errors may readily be learned.

A basic problem in telecommunication systems is the preservation of the continuity of communications between various points in the system, and accordingly, it is necessary that all parts of the system, particularly the exchange installations, be as reliable as possible. It is, therefore, necessary to maintain system operation in situations where portions of the system are malfunctioning. In commonly assigned U.S. application, Ser. No. 121,434, filed Mar. 5, 1971, a method is described for locating errors in program controlled data transmission exchange installations. The object of the process described in the reference application is to insure that in case of failure of one unit of the exchange installation, the entire installation will continue to function without interruption. Further, the process in the referenced application provides for the identification of a particular malfunctioning unit in the system in a very short time and localizes the defect within the identified unit. The referenced application utilizes a principle known in data processing of using a diagnostic program for operating the system or portions thereof. The diagnostic program is initiated upon the occurrence of an error, and from it, inferences may be drawn as to the type and location of the error. Disadvantages of the known diagnostic program techniques are overcome by the process described in the referenced application. These disadvantages arise primarily out of the fact that the malfunctioning unit or the maintenance personnel must control the operation of the diagnostic program.

The foregoing disadvantage is overcome by utilizing the process described in the referenced application. In particular, the latter process contemplates that the unit of the exchange installation which is recognized as being defective is placed in a special diagnosis state during which the unit in question is not operational, with respect to normal operations of the system. However, the malfunctioning unit is operational for the purpose of carrying out special diagnostic processes. Performance of the special diagnostic processes occur under the control of a diagnostic program in conjunction with properly functioning units of the exchange installation, and these properly functioning units are also placed in a diagnosis state either constantly or from time to time during a period determined by the diagnostic program. The operation of a diagnostic program in the malfunctioning unit always occurs in a step-wise fashion under the control of properly functioning units.

The process described in the referenced application has the advantage of being able to examine a malfunctioning unit with the assistance of properly functioning portions of the system. Under this arrangement, however, cooperation between the properly functioning units and the malfunctioning unit, which is always in the diagnosis state, is only possible when the needed properly functioning units are also in the diagnosis state. Thus, it is possible to limit the required number of units which participate in the operation of a diagnostic program. As a rule, it is sufficient for operating a diagnostic program that a properly functioning program control unit as well as a segment of a properly functioning storage unit be available for operation with the malfunctioning unit.

The principles of the invention described in the referenced application may be more readily understood by reference to the block diagram in FIG. 1. This Figure demonstrates the cooperation between the data processing or arithmetic units VE, the program control units PS and the central control units IS1 and IS2, which contain all central control equipment along with the central storage. It is assumed for purposes of this description that one of the units VE is malfunctioning and is placed in the diagnosis state as indicated by the cross-hatching in FIG. 1. In order to execute a diagnostic program, a properly functioning central control unit, for example IS1 in the central unit, is also placed in the diagnosis state. However, by this action, all other central control equipment which is a part of the central control unit IS1 is also simultaneously in the diagnosis state. Operation of the diagnostic program takes place under the control of a properly functioning program control unit PS, which can also assume the diagnosis state for the duration of one or more cycles of operation. Dashed connecting lines are used in FIG. 1 to indicate that for execution of the diagnostic program, the malfunctioning unit VE, the central unit IS1, which has been placed in the diagnosis state, and a properly functioning program control unit PS all operate together. Since the unit VE, which has been placed in the diagnosis state, is inactive with respect to the normally operating units, the information channels between this unit and the others are interrupted as shown in FIG. 1. The diagnostic program occupies a portion of the properly functioning storage in the central unit IS2, with which the program control unit PS, which controls the running of the diagnostic program, operates in normal use.

In a commonly assigned U.S. Pat. No. 3,660,824, filed June 9, 1971, it has been suggested that for a program controlled data exchange system, the demands for execution of certain sequences which proceed from units in the system to the central control unit be assigned to a central location. This will preserve certain priorities required by the operating unit or by the particular sequence. In order to accomplish this purpose, a sequence demand control including a sequence assignment register contains a specific relationship between storable bits of information about the priority of the sequence and the bits of information about the unit which executes a sequence. This information in the sequence assignment register is constituted by a particular address and information content. The aforementioned bits of information about the priority of the sequence to be executed serve for the assignment of sequence demands as internal register addresses, which addresses are used for a search process in the sequence assignment register. The results of this search are available as bits of information for the determination of the unit which is to execute the particular sequence. Every priority provided for in the system is thus accorded a specific register position in a sequence demand register forming a part of the sequence demand control.

According to the process described in the formerly referenced application, a coordination between single units of a system within the framework of a diagnostic program is only possible when the individual units of the system are in a diagnosis state. That means that a central control unit containing all the central control equipment, such as the storage, accumulation and distribution controls, the sequence demand controls and the central storage, must be placed in the diagnosis state in order to meet this prerequisite In case the central storage is sub-divided into storage areas or so-called storage banks, it is suggested in the formerly reference application that one of these storage banks be placed in the diagnosis state, instead of the entire central store.

An object of the invention is to provide a means by which the disadvantage connected with the placing of the entire control unit in the diagnosis state of loss of redundancy may be avoided.

SUMMARY OF THE INVENITON

The foregoing and other objects are accomplished according to the principles of the invention by utilizing the centrally located sequence demand control, placed in the diagnosis state, to receive, assign and select sequence demands sent by the units of the system for the operation of a diagnostic program in conjunction with the malfunctioning unit, as well as the properly functioning units controlling the sequence and the properly function storage. In the central sequence demand control, for the duration of the diagnosis state, only particular cycle-related sequence demands of those units which are in the diagnosis state are considered. By thus improving the invention described in the formerly referenced application, it is possible to form a complete system operating in the diagnosis state and to thereby reduce the loss of redundancy arising from the use of the procedure described in the formerly reference application.

BRIEF DESCRIPTION OF THE DRAWINGS

The invention will be best understood by reference to a preferred form for carrying the process of the invention described hereinbelow in conjunction with the drawings in which.

DETAILED DESCRIPTION OF THE DRAWINGS

Figure 1:
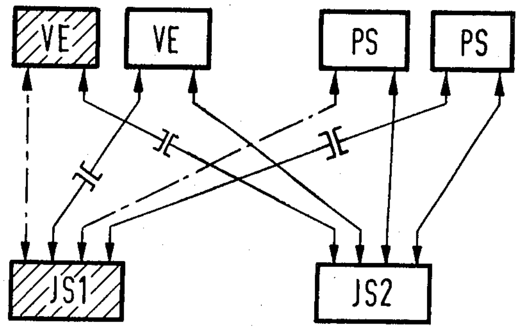
FIG. 1 is a block diagram of pertinent portions of a program controlled data exchange installation demonstrating a process described in U.S. application, Ser. No. 121,434.
Figure 2:
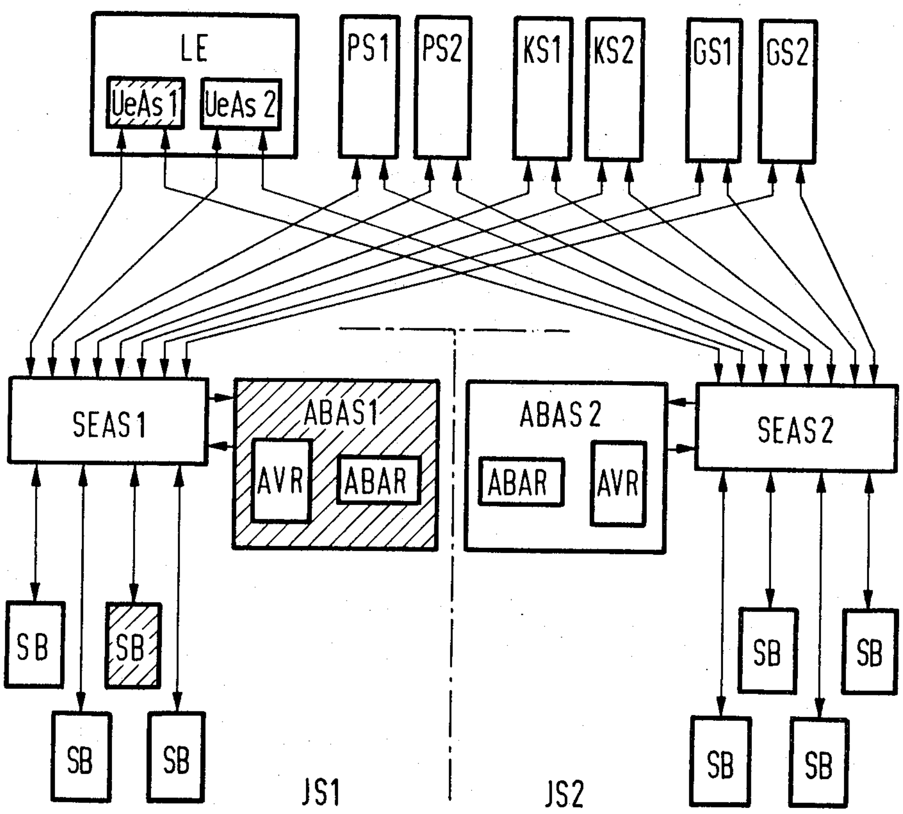
FIG. 2 is a block diagram of a program controlled data exchange system demonstrating the use of the process of the invention.

FIG. 2 illustrates in block diagram form the pertinent portions of a program controlled data exchange installation if known construction. The elements constituting the blocks are discussed in detail only insofar as necessary as to enable one skilled in the art to practice the invention. The system shown in FIG. 2 is similar to that illustrated in U.S. application, Ser. No. 121,434, and is constructed in modular form. Within the system shown in FIG. 2 all of the data and programs necessary for the operation of the system are located in the central memory unit. It is essential, that each of the aforementioned units has access to the memory, i.e., that information paths are provided from and to the memory.

The processing units LE, PS1, PS2 continually traffic cyclically over a memory input - output control SEAS with the memory sub-units, the so-called memory banks SB. The memory input-output control SEAS contains an input circuit and an output circuit as well as an input selection circuit and an output selection circuit associated therewith. Each memory bank SB contains an individual memory operation control and a series of core storages. First control channels are present for the transmission of control signals, which are sent out from the processing units, over which channels the processing units have access to the memory input - output control SEAS and therefrom to the individual memory banks SB. Second control channels are present in the direction from the meory banks to the memory input - output control or from there to the individual processing units. For the transmission of information, first and second information channels are provided, which in any given case are available for the duration of at least one cycle to the processing units demanding a cycle.

The individual processing units LE, PS1,PS2 direct their requests for the assignment of a memory cycle in the form of cycle demand signals together with an instruction as to the address of the desired part in the central memory in the form of the so-called memory word address over the control lines to the memory input - output control SEAS. In the input selection circuit a selection is made according to the priorities of the demanding processing units, whereby the occupation condition of the requested memory, i.e., the requested memory bank, is also simultaneously taken into consideration. The affected memory bank SB is reached over the control lines. With the following cycle a first information channel (between the demanding processing unit and the input circuit in the memory input - output control SEAS) and a second information channel (between the input circuit and the memory bank SB) will be made available. In the case that information is called back from the memory an information transmission over the output circuit in the memory input - output control SEAS will be made available in the same way. To increase the reliability the individual processing units as well as also the memory unit can be multiply present.

The memory input - output control SEAS thus regulates the traffic between the individual processing units and the central memory. However, in addition it is also necessary, that the processing units can enter into connect-ions between themselves. In correspondence with the principles of data exchange systems, the individual processing units work in parallel and/or independent from each other, i.e., the individual processing units can always enter into connection only over the central memory. Therefore, it is a problem of making possible a cyclic traffic between the individual processing units of such a system, insuring a priority dependent selection of received operations request, thereby characterized, that receipt distribution and selection of the operation requests sent by the processing units takes place at a central location over an operation request control, in which an operation distribution register contains a specific correlation given through address and contents between storable information about the priority of an operation and the information about the processing unit carrying out an operation. For the desired distribution of operation requests the information about the priority of the operation to be carried out serves an internal register address for a seeking operation in the operation distribution register. The latter results in information being available for the determination of the processing unit carrying out this operation. For the selection of operation requests the processing units instigate an associative search operation after the completeion of an operation, in the course of which the entire contents of the operation distribution register are available for a comparison operation, for which the information determining the demanding processing unit serves as comparison criterion, and as the result of which, the information stored in the operation demand control for this processing unit about the priority of highest value of an operation is available.

For solutions to this probelem the information about the priority of an operation is stored in a central sequence demand control ABAS. In addition, it is suggested to assign each priority envisioned in the system a specific register location, of an operation distribution register AVR which can be reached through an address formed from the information sent by the demanding processing unit about the memory word address and at which an operation bit is placed for the picking up and storing or operation demands. The receiption or the storage of the operation demands can thereby take place in an individual register, called sequence demand register ABAR. The various units constituting the exchange installation are present in pairs in order to provide redundance and thereby insure reliability. In particular, line connection unit LE has included therein traffic sequence controls U*e*AS, over which traffic with other parts of the system take place, and these are present in pairs. A detailed description of a line connection unit which may be used in conjunction with the embodiment of the invention described herein is to be found in allowed, commonly assigned U.S. application Ser. No. 71,675, filed Sept. 14, 1970. Program control units PS1, PS2, as well as the other program units designated KS1, KS2, GS1 and GS2 are present in pairs for the reasons set forth above. Details of the construction of a program control unit and the cyclic interoperation between this program control unit and the storage as discussed in U.S. Pat. No. 3,660,824. The two central units IS1 and IS2 contain, respectively, the storage, accumulation and distribution controls SEAS1 and SEAS2, as well as the sequence demand controls ABAS1 and ABAS1. The storage banks used herein may be conventional core storages constructed in the manner described in U.S. Pat. NO. 3,544,777. The sequence demand control are constructed as, discussed hereinabove, and contain, respectively, a sequence assignment register AVR and a sequence demand register ABAR. The central storage unit in each central control unit contains storage banks SB.

In order to describe the operation of this system according to the principles of this invention, it will be assumed that a traffic sequence control UeAS1 is malfunctioning, and this is denoted by the cross-hatching in FIG. 2. As discussed in application, Ser. No. 121,434, this malfunctioning unit is placed in the diagnosis state. Following a known practice, the diagnosis state may be indicated centrally by placing a specific bit in a specific portion of the sequence demand resitster ABAR. In accordance with the procedure described in the application, Ser. No. 121,434, a properly functioning storage and a properly functioning program control unit are necessary for the execution of the diagnostic program. Of course, the diagnostic program is being operated in order to analyze the malfunctioning traffic sequence controlled U*e*AS1 in the line connection unit LE. While the store, for example a storage bank SB, is kept in the diagnostic state for the entire duration of the diagnosis, the program control unit used for the diagnosis is in the diagnosis state only periodically, i.e., for only particular cycles of operation of the program. Communication between the program control unit and the malfunationing unit takes place over central control unit IS1.

In accordance with the principles of the invention, however, only a portion of the central control unit IS1 is placed in the diagnosis state; this portion is the central sequence demand control ABAS1. This is indicated by cross-hatching in the drawing. The malfunctioning unit, when the system connections have been made, can be tested with a diagnostic program, as described in application Ser. No. 121,434, without the need for placing all of the control equipment in the central unit IS1 in the diagnosis state. This insures a substantial increase in redundancy for the entire system. That is, those elements of the central unit IS1 which are not taking part in the diagnostic operation, as discussed above, are available to substitute for elements of central control unit IS2, if needed.

It is necessary to insure that information issuing from the sequence demand control which has been placed in the diagnosis state is evaluated by the proper units of the data processing system. Thus, all information coming from the sequence demand control in the diagnosis state is accompanied by an additional signal or bit of information. Thus, all other units of the system which are not in the diagnosis state can ignore the information which is pertinent only to diagnosis state. Accordingly, it is insured that properly functioning portions of the system are not interferred with by malfunctions of other portions.

Within the framework of the invention, it is possible to provide for a specific portion in the sequence demand register ABAR in which can be placed demand bits independently of whether the sequence demand register is in a normally functioning state or is in a diagnosis state. Accompanying pieces of information of single units can be issued therefrom without a distinguishing additional signal for the state of the sequence demand control.

The sequence demand control can be transferred from the diagnosis state by simply extinguishing the bit in the sequence demand register which indicates the diagnosis state. Procedures for so extinguishing a bit in such a register are well-known and need not be further described.

The preferred form for the invention described hereinabove is intended only to be exemplary of the principles of the invention and is intended in no way to define the scope of the invention. The scope of the invention is defined by the appended claims.

We claim:

1. A method for error diagnosis for the use in combination with a diagnosis program in a program controlled data exchange installation constituted by a plurality of system units wherein, under said diagnosis program a number of said system units, as needed to carry out said program, operate together cyclically and with a central storage means and wherein a system unit determined to be malfunctioning is placed in a diagnosis state whereby it functions only under the control of the diagnosis program in conjunction with said number of properly functioning system units comprising the steps of:

switching a sequence demand control, which receives assigns and selects sequence requirements from system units, to a diagnosis state for running said diagnosis program in conjunction with said malfunctioning system unit, a properly functioning program control unit controlling the sequence and a properly function storage means, and processing in said sequence demand control, for the duration of said diagnosis state, only cycle-related sequence demands of said number of system units, which are at the time in a diagnosis state.

2. The method defined in claim 1 wherein said sequence demand control includes a sequence demand register having a first part for storing information indicating the priority of a sequence and a second part and comprising the additional step of:

placing at least a data bit in a predetermined portion in said second part of said sequence demand register indicating whether or not a system unit is in the diagnosis state.

3. The method defined in claim 2 comprising the additional step of:

adding to information issuing from said sequence demand control, which sequence demand control is in the diagnosis state, an additional signal delivered by said second part of said sequence demand control whereby system units not in said diagnosis state will not respond to said information.

* * * * *